(12) United States Patent
Jin (10) Patent No.: US 7,660,803 B2
(45) Date of Patent: Feb. 9, 2010

(54) POLICY-BASED MANAGEMENT METHOD AND SYSTEM FOR PRINTING OF EXTENSIBLE MARKUP LANGUAGE (XML) DOCUMENTS

(75) Inventor: Seung-eui Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 815 days.

(21) Appl. No.: 11/208,847

(22) Filed: Aug. 23, 2005

(65) Prior Publication Data

US 2006/0064420 A1 Mar. 23, 2006

(30) Foreign Application Priority Data

Sep. 20, 2004 (KR) .................. 10-2004-0075062

(51) Int. Cl.
*G06F 7/00* (2006.01)
(52) U.S. Cl. .................. 707/100; 709/225; 710/8; 235/462.01
(58) Field of Classification Search .......... 710/8; 235/432, 462.01; 707/100
See application file for complete search history.

(56) References Cited

U.S. PATENT DOCUMENTS

| | | | | |
|---|---|---|---|---|
| 6,826,609 | B1 * | 11/2004 | Smith et al. | 709/225 |
| 7,110,541 | B1 * | 9/2006 | Lunt et al. | 380/51 |
| 7,173,728 | B2 * | 2/2007 | Suzuki et al. | 358/1.15 |
| 7,356,539 | B2 * | 4/2008 | Brown et al. | 707/100 |
| 7,367,060 | B2 * | 4/2008 | Someshwar | 726/27 |
| 2003/0136841 | A1 * | 7/2003 | Alleshouse | 235/462.01 |
| 2003/0182475 | A1 * | 9/2003 | Gimenez | 710/8 |

(Continued)

FOREIGN PATENT DOCUMENTS

JP 2000-330908 11/2000

(Continued)

OTHER PUBLICATIONS

Office Action from Korean Intellectual Property Office, dated Feb. 27, 2006.

*Primary Examiner*—John R. Cottingham
*Assistant Examiner*—Sherief Badawi
(74) *Attorney, Agent, or Firm*—Roylance, Abrams, Berdo & Goodman, L.L.P.

(57) ABSTRACT

There are provided a policy-based extensible markup language (XML) document print management method and system, using a policy object defining a print layout and an access authority to output data, on the basis of the information of a user requesting to print the XML document. The policy-based XML document print management method includes (a) requesting a policy object defining a printing layout and an access authority to output data to a policy management server, on the basis of information of a user requesting to print the XML document, in a policy agent; (b) receiving the policy object from the policy management server, interpreting the policy object, and obtaining policy information, in the policy agent; and (c) printing the XML document using the policy information, in the policy agent. Therefore, it is possible to determine a printing layout of an XML document and print the XML document, according to policy information. Also, by determining whether a user requesting to print the XML document has an access authority to the XML document on the basis of the policy information, it is possible to allow the printing job only to the user having the access authority.

14 Claims, 5 Drawing Sheets

U.S. PATENT DOCUMENTS

| | | | |
|---|---|---|---|
| 2004/0006744 A1* | 1/2004 | Jones et al. | 715/514 |
| 2004/0051893 A1* | 3/2004 | Yoshida | 358/1.11 |
| 2005/0262049 A1* | 11/2005 | Somppi | 707/3 |

FOREIGN PATENT DOCUMENTS

| | | |
|---|---|---|
| JP | 2002-091726 | 3/2002 |
| JP | 2002-229752 | 8/2002 |
| JP | 2002-259079 | 9/2002 |
| JP | 2002-334294 | 11/2002 |
| JP | 2003-029577 | 1/2003 |
| JP | 2003-280849 | 10/2003 |
| JP | 2004-054311 | 2/2004 |
| JP | 2004-139466 | 5/2004 |
| KR | 1020030005059 | 1/2003 |
| KR | 1020030040113 | 5/2003 |

* cited by examiner

POLICY-BASED MANAGEMENT METHOD AND SYSTEM FOR PRINTING OF EXTENSIBLE MARKUP LANGUAGE (XML) DOCUMENTS

BACKGROUND OF THE INVENTION

This application claims the benefit under 35 U.S.C. 119(a) of Korean Patent Application No. 2004-75062, filed on Sep. 20, 2004, in the Korean Intellectual Property Office, the entire contents of which are incorporated herein by reference.

1. Field of the Invention

The present invention relates to a policy-based management method and system for printing eXtensible Markup Language (XML) documents. More particularly, the present invention relates to a policy-based management method and system for printing extensible markup language (XML) documents, using a policy object defining an access authority for output data and printing layouts, on the basis of user information.

2. Description of the Related Art

Recently, as eXtensible Markup Language (XML) has become popular as a tool for producing web contents, more companies and service agents create and manage business data, and the like using XML.

The eXtensible Markup Language (XML) is a page description language substituting for a HyperText Markup Language (HTML), being standardized by the WWW Consortium, and is generally referred to as 'XML'. XML has been developed to optimize a Standard Generalized Markup Language (SGML) for the Internet while extending link functions, for example, used in HTML, so as to have all the benefits of HTML and SGML.

In other words, the XML has a function for allowing a user to define new tags in HTML, as a method for solving the limitation of HTML and the complexity of SGML. Also, the XML, which is a subset having the practical functions of SGML, can be widely used in electronic publication, medical field, management, legal field, selling automation, digital library, electronic commerce service, and so on, as well as on the Internet.

Data defined in XML is processed using the XML that defines the data part of the data and an eXtensible Stylesheet Language (XSL) that defines a description of the data. Here, the XSL is a language used for creating a stylesheet for describing how data transmitted through a web page using XML is shown to a user. XSL provides to a developer a tool capable of designating where and how to display data fields in an XML file. Like conventional stylesheet languages, XSL can be used to define styles of XML documents and also re-used for various XML documents.

In other words, data itself and a method for describing the data are separately created and managed. Recently, as XML-based contents have included a large amount of database managing corporate information or client information, policy-based management for XML data, such as access management and data output layout management, is increasingly required. However, existing XML-based and XSL-based data processing methods are not suitable to process various policies and accordingly CANNOT control and manage such policies independently.

U.S. Patent Publication No. 20040006744 entitled "System and Method for Validating an XML Document and Reporting Schema Violations", which is incorporated herein by reference, provides a method which detects logical errors for grammatical or specific contexts of XML documents using an internal validation engine. In the U.S. Patent Publication, a policy for automatically detecting errors and defects is described, however, policy-based management for printing of XML documents is not described.

SUMMARY OF THE INVENTION

The present invention provides a policy-based management method for printing extensible Markup Language (XML) documents, using a policy object defining printing layouts and an access authority to output data, on the basis of the information of a user requesting the printing of XML documents.

The present invention also provides a policy-based management system for printing extensible Markup Language (XML) documents, using a policy object defining printing layouts and an access authority to output data, on the basis of the information of a user requesting the printing of XML documents.

According to an aspect of the present invention, there is provided a method for managing printing of an eXtensible Markup Language (XML) document, comprising (a) requesting a policy object defining a printing layout and an access authority to output data to a policy management server, on the basis of information of a user requesting to print the XML document, in a policy agent; (b) receiving the policy object from the policy management server, interpreting the policy object, and obtaining policy information, in the policy agent; and (c) printing the XML document using the policy information, in the policy agent.

According to another aspect of the present invention, there is provided a system for managing printing of an eXtensible Markup Language (XML) document, comprising a policy agent for requesting a policy object defining a printing layout and an access authority to output data to a policy management server, on the basis of information of a user requesting to print the XML document; a policy management server for transmitting the policy object to the policy agent in response to the request; and a policy repository for storing the policy object, wherein the policy agent receives the policy object from the policy management server, interprets the policy object, obtains policy information, and prints the XML document using the policy information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Hereinafter, embodiments of the present invention will be described in detail with reference to the accompanying drawings.

Figure 1:
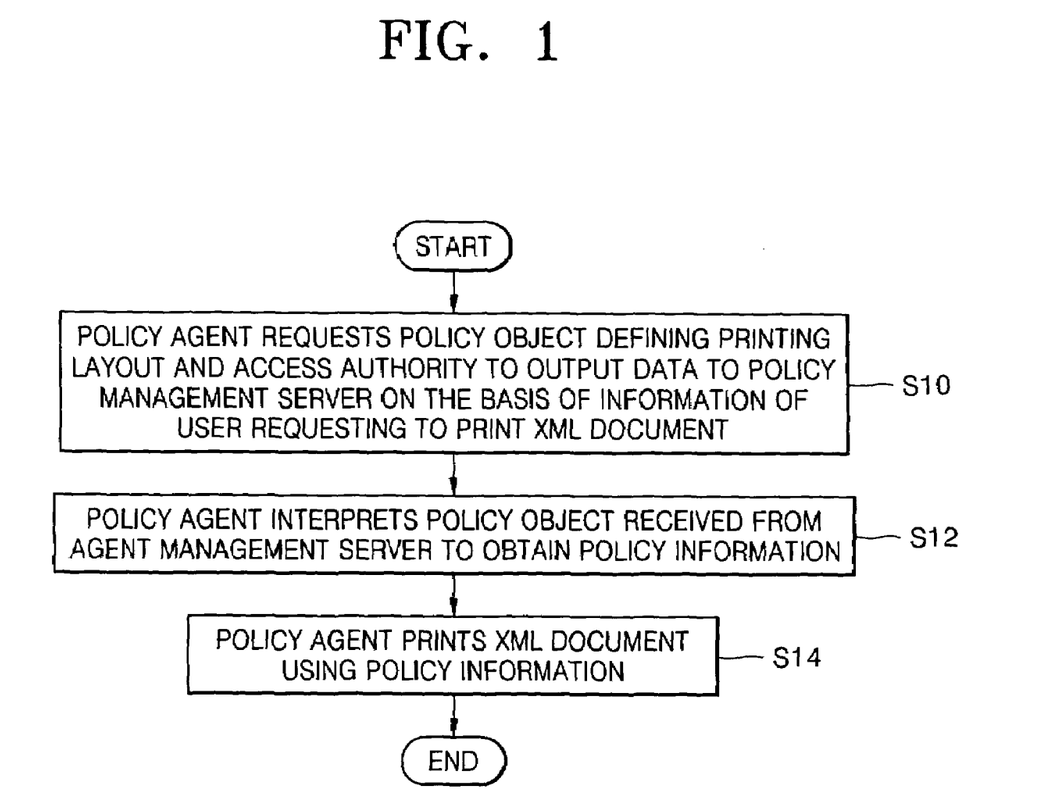
FIG. 1 is a flowchart illustrating a policy-based management method for printing of eXtensible Markup Language (XML) documents, according to an embodiment of the present invention.

FIG. 1 is a flowchart illustrating a policy-based eXtensible Markup Language (XML) document print management method according to an embodiment of the present invention.

Referring to FIG. 1, a policy agent requests a policy object defining a printing layout and an access authority for output data to a policy management server, on the basis of the information of a user requesting to print an XML document (operation S10). Then, the policy agent receives the policy object from the policy management server, interprets the policy object, and obtains policy information at step S12, and then prints the XML document using the policy information at step S14.

Figure 2:
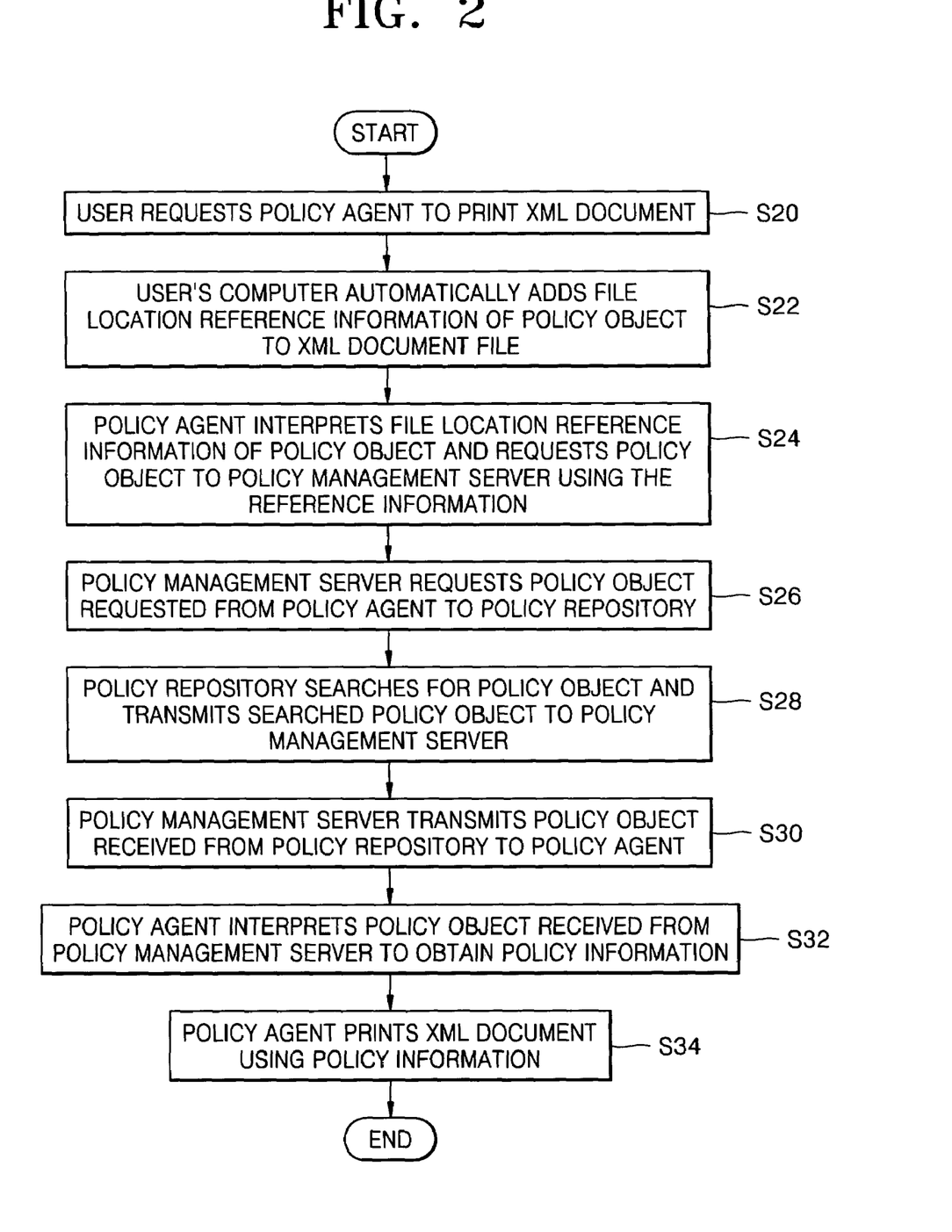
FIG. 2 is a flowchart illustrating the policy-based XML document print management method according to an embodiment of the present invention.

Referring to FIG. 2, the policy-based XML document print management method is described in more detail.

As shown in FIG. 2, first, a user requests the policy agent to print an XML document at step S20. At this time, the user's computer automatically inserts reference information for the location of a file indicating a policy object defining a printing layout and an access authority to output data, to a corresponding XML document file, on the basis of the information of the user requesting to print the XML document at step S22.

The policy agent interprets the file location reference information of the policy object and requests the policy object to the policy management server using the reference information at step S24. The policy management server requests the policy object requested from the policy agent to a policy repository at step S26. The policy repository searches for the policy object requested from the policy management server and transmits the searched policy object to the policy management server at step S28. The policy management server transmits the policy object received from the policy repository to the policy agent at step S30.

The policy agent interprets the policy object received from the policy management server, obtains policy information at step S32, and prints the XML document using the policy information at step S34. Specifically, the policy agent determines a printing layout of the XML document according to the policy information and prints the XML document. Also, the policy agent determines whether the user requesting to print the XML document has an access authority to the XML document on the basis of the policy information, and prints the XML document if it is determined that the user has the access authority. The policy agent may be included in a printing apparatus.

Figure 3:
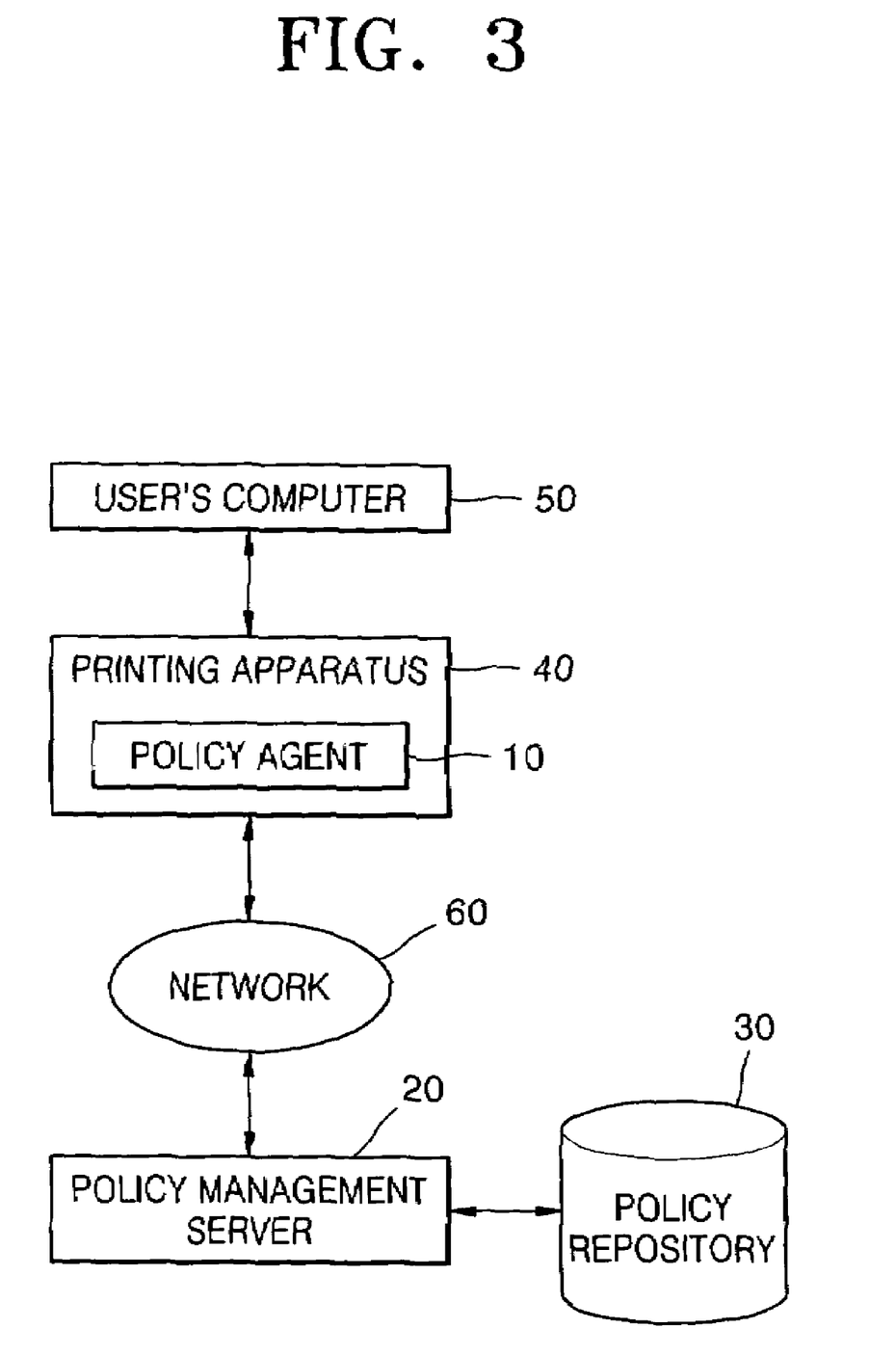
FIG. 3 is a block diagram showing a policy-based management system for printing of XML documents, according to an embodiment of the present invention.

FIG. 3 is a block diagram of a policy-based XML document print management system according to an embodiment of the present invention.

Referring to FIG. 3, the policy-based XML document print management system comprises a policy agent 10, a policy management server 20, and a policy repository 30. The policy agent 10 can be included in a printing apparatus 40. The printing apparatus 40 is connected to a user's computer 50 and can be connected to the policy management server 20 through a network. The policy management server 20 can be connected to the policy repository 30 through a local area network (LAN) or through a system bus.

The policy-based XML document print management system can provide a data output method customized according to the information of a user requesting to printing an XML-based document or XML-based data. In other words, the system converts user information to a printing policy, and the printing apparatus 40 (for example, a printer) selectively outputs data according to the printing policy and performs an output layout suitable to the data.

The present invention relates to how to set a printing policy and associate the printing policy with XML-based data to be output, in order to support data outputs customized for each user. Accordingly, the present invention provides a method for defining an XML-compatible printing policy object and registering and managing the policy object.

In FIG. 3, the policy repository 30 stores the policy object in a database and manages the policy object. If a policy object search request is issued from the policy management server 20, the policy repository 30 searches for a corresponding policy object and transfers the searched policy object to the policy management server 20. As such, by separating the policy repository 30 from the policy management server 20 and allowing the policy repository 30 to operate policy objects using a directory service, quick searching is possible and data for policy objects and operations can be independently optimized.

The policy agent 10, which is included in the printing apparatus 40 (for example, a printer), requests a policy object for XML data to be printed to the policy management server 20, receives the policy object from the policy management server 20, interprets the policy object, and then applies the interpreted result to a printing job.

The agent 10 requests a policy object defining a printing layout and an access authority for output data to the policy management server 20, on the basis of the information of the user requesting to print the XML document. Then, the policy management server 20 transmits the policy object to the policy agent 10 in response to the request. The policy agent 10 receives the policy object from the policy management server 20, interprets the policy object to obtain policy information, and prints the XML document using the policy information.

Specifically, the policy agent 10 determines a printing layout of the XML document according to the policy information and prints the XML document. Also, the policy agent 10 determines whether the user requesting to print the XML document has an access authority for the XML document on the basis of the policy information, and prints the XML document if it is determined that the user has the access authority for the XML document.

The policy management server 20 requests the policy object requested from the policy agent 10 to the policy repository 30, and the policy repository 30 searches for the policy object requested from the policy management server 20 and transmits the searched policy object to the policy management server 20.

In the present invention, the policy object is defined. A policy object is formed as a separate file defining a policy, like an XML-based eXtensible Stylesheet Language (XSL) stylesheet. In the present invention, reference information for a policy object file is included in an XML file comprising data to be printed, thus allowing the printing apparatus 40 to automatically refer to the policy object file.

In other words, the policy object defines an access authority for output data and a printing layout customized for XML-based printing data. The policy object also defines a rule for interpreting an XML tag for an XML document to be printed according to a pre-defined policy. Preferably, to efficiently manage the policy object, integrated management is carried out at a specific repository in a management domain. Also, reference information for the policy object is included in the XML document so that the policy object can be freely referred to in the network environment.

Hereinafter, the operations of the policy-based XML document print management system according to an embodiment of the present invention will be described with reference to FIGS. 4 and 5.

Figure 4:
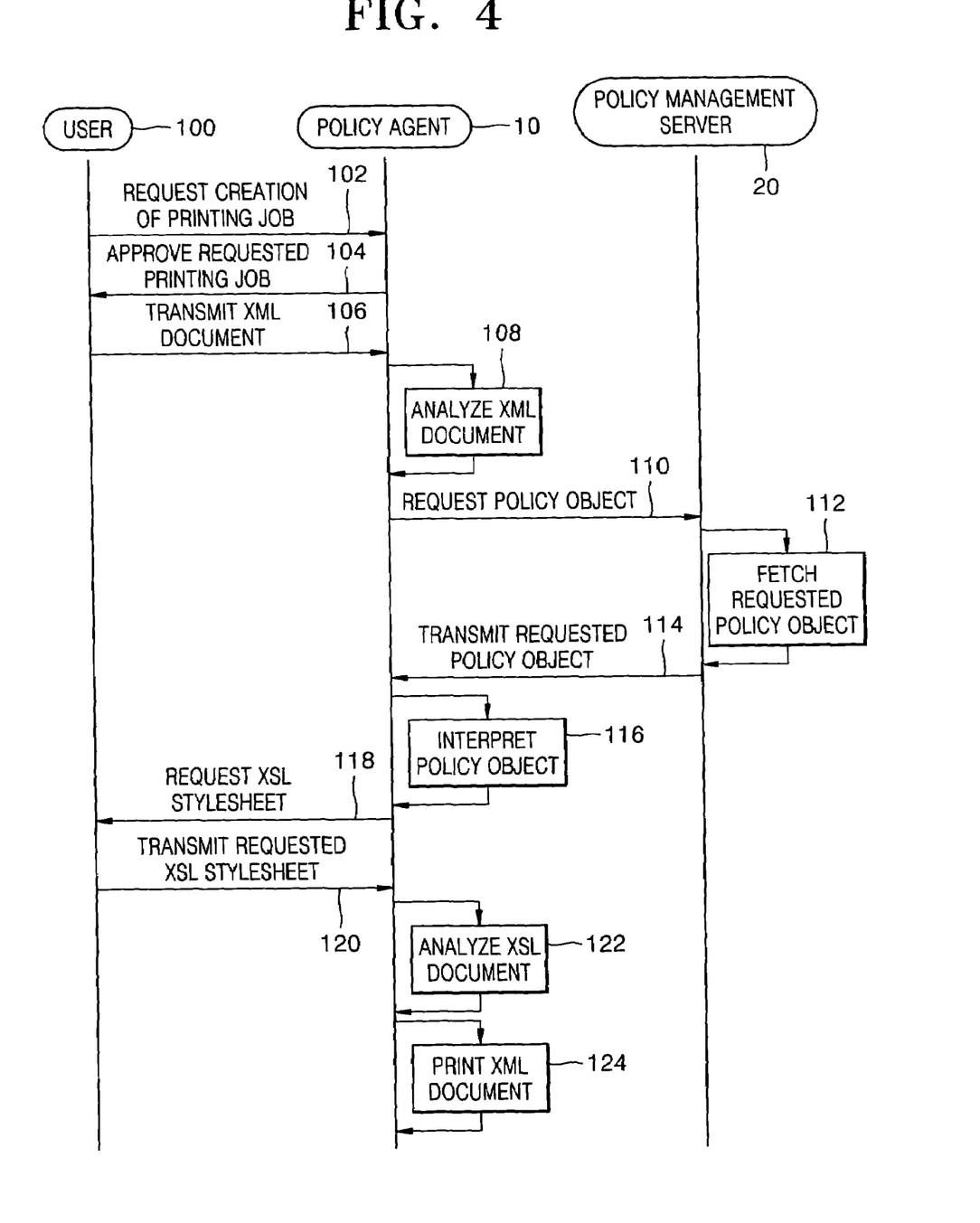
FIG. 4 is a flowchart illustrating the operations of the policy-based XML document print management system according to an embodiment of the present invention.
Figure 5:
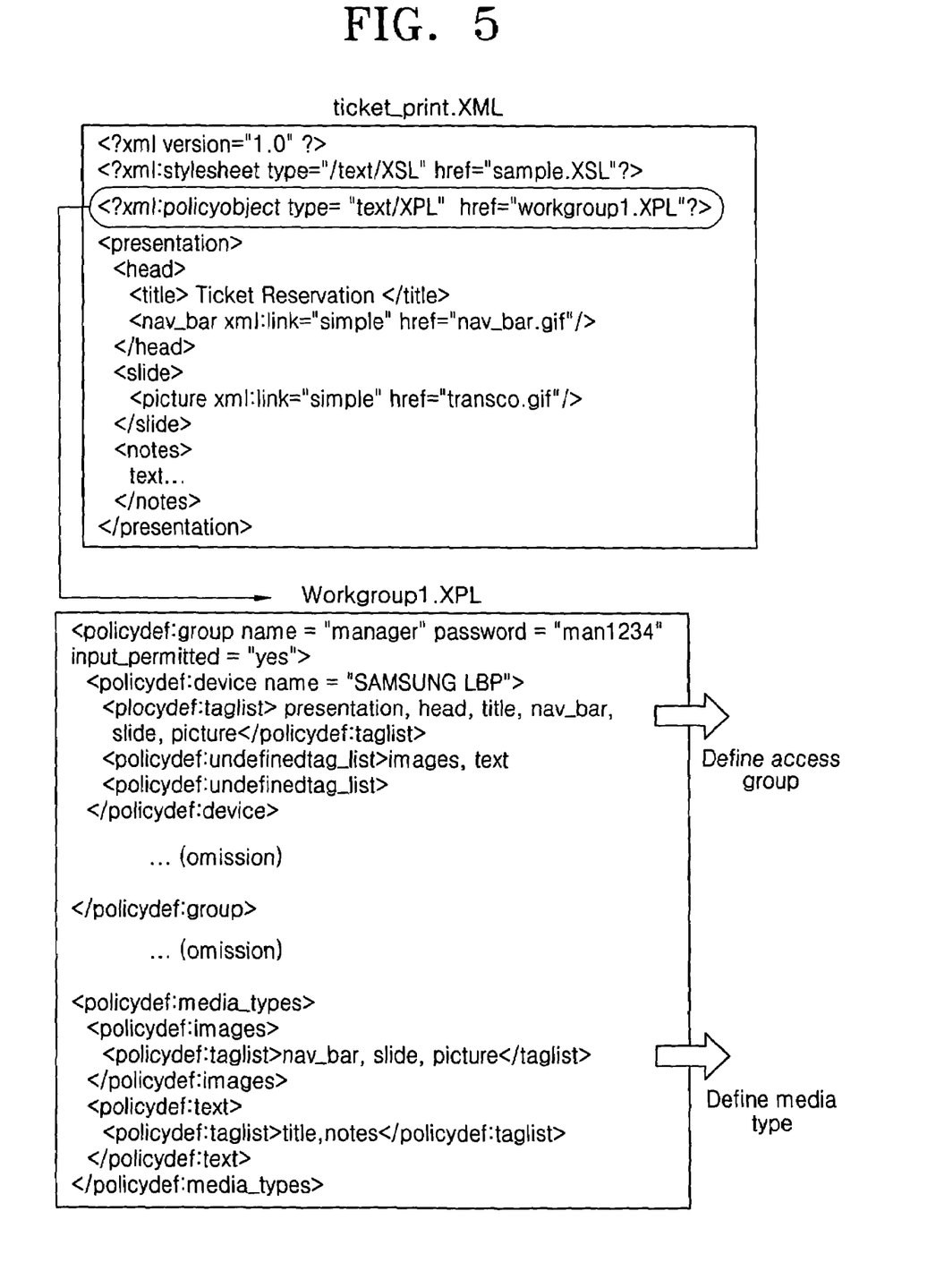
FIG. 5 shows an example of a policy repository for storing a policy object file according to an embodiment of the present invention.

Referring to FIG. 4, a user 100 requests a creation for a printing job to a policy agent 10 at step 102. The user 100 browses XML-based data and then requests to output the data. At this time, reference information indicating the location of a corresponding policy object is automatically added to the data by a driver software installed in the user's computer. The reference information for the location of the policy object can be defined in an XML file including data to be output, as shown in FIG. 5. FIG. 5 shows an example in which an XML file refers to a policy object file.

If the policy agent 10 approves of the printing job at step 104, the user 100 transmits the XML document to the policy agent 10 at step 106. The policy agent 10 receiving the XML document analyzes the XML document at step 108, searches for the reference information indicating the location of the policy object included in the XML document, and interprets the reference information. The policy agent 10 performs a GET operation for obtaining the policy object using the reference information. That is, the policy agent 10 requests the policy object from the policy management server 20 at step 110. In the GET operation, a request packet comprising the location of a source and operation codes for the GET operation is transmitted to the policy management server 20 and the policy management server 20 searches for a corresponding policy object at step 112 and transmits the policy object to the policy agent 10 at step 114, similarly with the GET operation of HyperText Transfer Protocol (HTTP) which is standard in the Web service. Here, the policy management server 20 can search for the policy object in connection with the policy repository 30.

After the policy agent 10 obtains the policy object from the policy management server 20, the policy agent 10 interprets the policy object and obtains policy information defining a printing layout and an access authority for output data from the interpreted result at step 116. Technically, the policy information represents interpretation information for an XML tag. Therefore, it is possible to designate a layout of an XML tag and a format of printed outputs to be shown to a specific user group, on the basis of the interpretation information for the XML tag. Also, it is possible to fetch a different XML stylesheet for a requested printing job according to a policy defined in the policy object. For example, the policy agent 10 requests an XSL stylesheet to the user 100 at step 118 and the user transmits the requested XSL stylesheet to the policy agent 10 at step 120. The policy agent 10 analyzes the received XSL stylesheet at step 122. Therefore, in the policy-based XML document print management method according to the present invention, it is possible to show different print outputs for the same XML document between a default case without policy application and a specific case with policy application.

The policy agent 10 prints the XML document on the basis of the XML tag interpretation method and the XML stylesheet customized for the user requesting the printing service at step 124.

As described above, according to the present invention, it is possible to print an XML document using a policy object based on the information of a user requesting to print the XML document.

Also, it is possible to determine a printing layout of the XML document and print the XML document, according to policy information included in the policy object.

Also, it is possible to determine whether the user requesting to print the XML document has an access authority to the XML document on the basis of the policy information and to print the XML document if it is determined that the user has the access authority.

Further, it is possible to print XML-based database information requesting various print formats, thereby maximizing the flexibility and efficiency of printing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for managing printing of an eXtensible Markup Language (XML) document, comprising:
   (a) receiving, at a policy agent included in a printing apparatus, a user request to print an XML document;
   (b) analyzing, at the policy agent, the XML document and requesting a policy object defining a printing layout and an access authority to output data, to a policy management server, wherein the policy object is identified by reference information for the location of the policy object located in the XML document;
   (c) receiving, at the policy agent, the policy object from the policy management server, interpreting the policy object, and obtaining policy information from the policy object; and
   (d) determining, at the policy agent, whether the user requesting to print the XML document has an access authority to the XML document on the basis of the policy information, and if it is determined that the user has the access authority, printing the XML document according to the policy information,
   wherein the policy information represents interpretation information for an XML tag.

2. The method of claim 1, wherein, after operation (b), the policy management server requests the policy object requested from the policy agent to a policy repository, and the policy repository searches for the policy object requested from the policy management server and transmits the searched policy object to the policy management server.

3. The method of claim 1, wherein, when the user requests the policy agent to print the XML document, a user's computer automatically adds the reference information for the location of a file representing the policy object to a file comprising the XML document.

4. The method of claim 1, wherein, in operation (b), the policy agent interprets reference information for the location of a file representing the policy object and requests the policy object to the policy management server using the reference information.

5. The method of claim 1, in operation (d), further comprising:
   determining a printing layout of the XML document according to the policy information prior to printing the XML document.

6. A system for managing printing of an eXtensible Markup Language (XML) document, comprising:
   a policy agent, included in a printing apparatus, for requesting a policy object defining a printing layout and an access authority to output data, to a policy management server, upon receiving a request from a user to print an XML document;

a policy management server for transmitting the policy object to the policy agent in response to the request, wherein the policy object is located using reference information contained in the XML document for identifying the location of the policy object; and a policy repository for storing the policy object;

wherein the policy agent receives the policy object from the policy management server, interprets the policy object, obtains policy information, and determines whether the user requesting to print the XML document has an access authority to the XML document on the basis of the policy information, and if it is determined that the user has the access authority, the XML document is printed according to the policy information, wherein the policy information represents interpretation information for an XML tag.

7. The system of claim 6, wherein the policy management server requests the policy object requested from the policy agent to the policy repository, and the policy repository searches for the policy object requested from the policy management server and transmits the searched policy object to the policy management server.

8. The system of claim 6, further comprising:

a computer automatically adding the reference information for the location of a file representing the policy object to a file comprising the XML document, when the user requests the policy agent to print the XML document.

9. The system of claim 8, wherein the policy agent interprets the file location reference information of the policy object, and requests the policy object to the policy management server using the file location reference information.

10. The system of claim 6, wherein the policy agent determines a printing layout of the XML document according to the policy information, and prints the XML document.

11. The method of claim 1, wherein, operation (a) further comprises receiving the XML document, at the policy agent, from the requesting user if the user request is approved by the policy agent.

12. The system of claim 6, wherein the policy agent is configured to approve the user's request to print an XML document and further receives the XML document from the requesting user.

13. The method of claim 1, wherein in step (d), the XML document is printed in a defined layout on the basis of information of the user requesting to print the XML document.

14. The system of claim 6, wherein the XML document is printed in a defined layout on the basis of information of the user requesting to print the XML document.

* * * * *

UNITED STATES PATENT AND TRADEMARK OFFICE
CERTIFICATE OF CORRECTION

PATENT NO. : 7,660,803 B2 Page 1 of 1
APPLICATION NO. : 11/208847
DATED : February 9, 2010
INVENTOR(S) : Seung-eui Jin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Signed and Sealed this

Twenty-eighth Day of December, 2010

David J. Kappos
*Director of the United States Patent and Trademark Office*